US012742434B1

(12) United States Patent
Walker

(10) Patent No.: US 12,742,434 B1
(45) Date of Patent: Sep. 22, 2026

(54) SOOT-LESS EXHAUST GAS RECIRCULATION (EGR) SYSTEM

(71) Applicant: Mark H. Walker, Cleveland, AL (US)

(72) Inventor: Mark H. Walker, Cleveland, AL (US)

( * ) Notice: Subject to any disclaimer, the term of this patent is extended or adjusted under 35 U.S.C. 154(b) by 0 days.

(21) Appl. No.: 19/169,271

(22) Filed: Apr. 3, 2025

Related U.S. Application Data

(60) Provisional application No. 63/573,634, filed on Apr. 3, 2024.

(51) Int. Cl.
*F02M 26/35* (2016.01)
*F02M 26/23* (2016.01)

(52) U.S. Cl.
CPC ............ *F02M 26/35* (2016.02); *F02M 26/23* (2016.02)

(58) Field of Classification Search
CPC ............................... F02M 26/35; F02M 26/23
See application file for complete search history.

(56) References Cited

U.S. PATENT DOCUMENTS 3,960,528 A * 6/1976 Jacobs .................... F01N 3/037 55/424
5,720,165 A * 2/1998 Rizzie ..................... F23B 90/06 60/39.464
6,301,887 B1 10/2001 Gorel et al.
8,769,931 B2 * 7/2014 Nam ....................... F01N 3/106 60/299
2006/0123773 A1 6/2006 Zhang
2011/0153179 A1 6/2011 Guglielmone et al.
2014/0020361 A1 * 1/2014 Warey .................... F02M 26/35 60/273
2014/0260211 A1 * 9/2014 Patchett .................. F01N 3/027 60/297
2014/0331643 A1 11/2014 Reich et al.
2016/0281580 A1 9/2016 Tabares et al.
2018/0112581 A1 4/2018 Han
2020/0070077 A1 * 3/2020 Rakovec ............... F02B 75/282
(Continued)

FOREIGN PATENT DOCUMENTS

JP 2011058428 A * 3/2011
JP 2016113935 A * 6/2016
KR 100759516 B1 * 10/2007 ............ F02M 26/41
(Continued)

OTHER PUBLICATIONS

Translation of JP2011058428 (Year: 2011).*
Translation of KR20160085737 (Year: 2016).*

*Primary Examiner* — Jesse S Bogue
(74) *Attorney, Agent, or Firm* — Cramer Patent & Design, PLLC.; Aaron R. Cramer

(57) ABSTRACT

A soot-less exhaust gas recirculation (EGR) system configured for use with diesel engines effectively reduces soot and carbon buildup, enhancing engine reliability, efficiency, and compliance with emission standards. The system includes a cyclone separator having a cyclone body, inlet, discharge cone, and outlet. Exhaust gas containing soot enters through the inlet, undergoing spiral airflow within the cyclone body, separating soot into the discharge cone, then through a siphon tube to a diesel particulate filter. Processed air substantially free of soot exits via the cyclone separator outlet into an exhaust gas recirculation cooler, which cools the processed air using inlet and outlet cooling lines before delivery to an intake manifold through a crossover line.

2 Claims, 3 Drawing Sheets

(56) References Cited

U.S. PATENT DOCUMENTS

| | | | |
|---|---|---|---|
| 2020/0173399 | A1 | 6/2020 | Kang et al. |
| 2023/0141121 | A1 | 5/2023 | Jang |

FOREIGN PATENT DOCUMENTS

| | | | | | |
|---|---|---|---|---|---|
| KR | 20160085737 | A | * | 7/2016 | ............. F02M 26/22 |
| WO | WO-2010044517 | A1 | * | 4/2010 | ............... F01N 5/02 |
| WO | 2010123411 | A1 | | 10/2010 | |

* cited by examiner

SOOT-LESS EXHAUST GAS RECIRCULATION (EGR) SYSTEM

RELATED APPLICATIONS

The present device was first described in and is a continuation of U.S. Provisional Application No. 63/573,634, filed Apr. 3, 2024, the entire disclosures of which are incorporated herein by reference.

FIELD OF THE DEVICE

The present device relates generally to exhaust gas recirculation (EGR) systems for diesel engines, specifically to systems designed to reduce soot and carbon buildup within such engines.

BACKGROUND OF THE DEVICE

Conventional exhaust gas recirculation (EGR) systems in diesel engines commonly experience issues with carbon and soot buildup, leading to frequent clogging and high maintenance and repair costs. These issues negatively affect engine efficiency, reliability, and compliance with stringent emission standards. Over time, accumulated soot and carbon particulates restrict airflow, decrease thermal efficiency, and impair combustion processes, resulting in reduced fuel economy, increased emissions, and potential engine damage. Moreover, frequent maintenance interventions to clear soot buildup often require significant downtime, labor costs, and replacement of expensive components. The device of the present application addresses these problems efficiently and cost-effectively by employing a cyclone separator designed to effectively remove soot and carbon particulates before they enter critical engine components. By preventing buildup, the device reduces clogging and the associated frequent maintenance. This significantly decreases operational downtime and maintenance-related expenses, improves fuel economy, and enhances overall engine reliability and longevity, providing a highly economical and efficient solution compared to conventional EGR systems.

SUMMARY OF THE DEVICE

An embodiment of the soot-less exhaust gas recirculation (EGR) system 10 consists of a cyclone separator 15, an exhaust gas recirculation (EGR) cooler 20, an EGR valve 21, an inlet cooling line 25, an outlet cooling line 26, a discharge cone 30, soot 35, a siphon tube 40, an intake manifold 44, an exhaust manifold 45, a diesel particulate filter 46, exhaust gas 50, a crossover line 55, a diesel engine 56, an inlet 65, a cyclone body 70, processed air 80, and an outlet 85. The cyclone separator 15 has an inlet 65 directly in fluid communication with the diesel engine 56 or alternately with the exhaust manifold 45 to receive exhaust gas 50 containing soot 35. The cyclone body 70 directs the exhaust gas 50 in a spiral flow, separating soot 35 downward into the discharge cone 30, then into the siphon tube 40, which communicates with the exhaust manifold 45 for soot 35 disposal via the diesel particulate filter 46. Processed air 80 exits upward through the cyclone separator outlet 85 into the EGR cooler 20, which provides thermal transfer via the inlet cooling line 25 and outlet cooling line 26. Finally, the cooled processed air 80 travels through the crossover line 55 into the intake manifold 44, completing the recirculation process.

BRIEF DESCRIPTION OF THE DRAWINGS

1. Description of the Drawings

The advantages and features of the present invention will become better understood with reference to the following more detailed description and claims taken in conjunction with the accompanying drawings, in which like elements are identified with like symbols, and in which:

| DESCRIPTIVE KEY | |
|---|---|
| 10 | soot-less exhaust gas recirculation (EGR) system |
| 15 | cyclone separator |
| 20 | exhaust gas recirculation (EGR) cooler |
| 21 | exhaust gas recirculation (EGR) valve |
| 25 | inlet cooling line |
| 26 | outlet cooling line |
| 30 | discharge cone |
| 35 | soot |
| 40 | siphon tube |
| 44 | intake manifold |
| 45 | exhaust manifold |
| 46 | diesel particulate filter |
| 50 | exhaust gas |
| 55 | crossover line |
| 56 | diesel engine |
| 65 | inlet |
| 70 | cyclone body |
| 80 | processed air |
| 85 | outlet |

2. Description of the Invention

Figure 1:
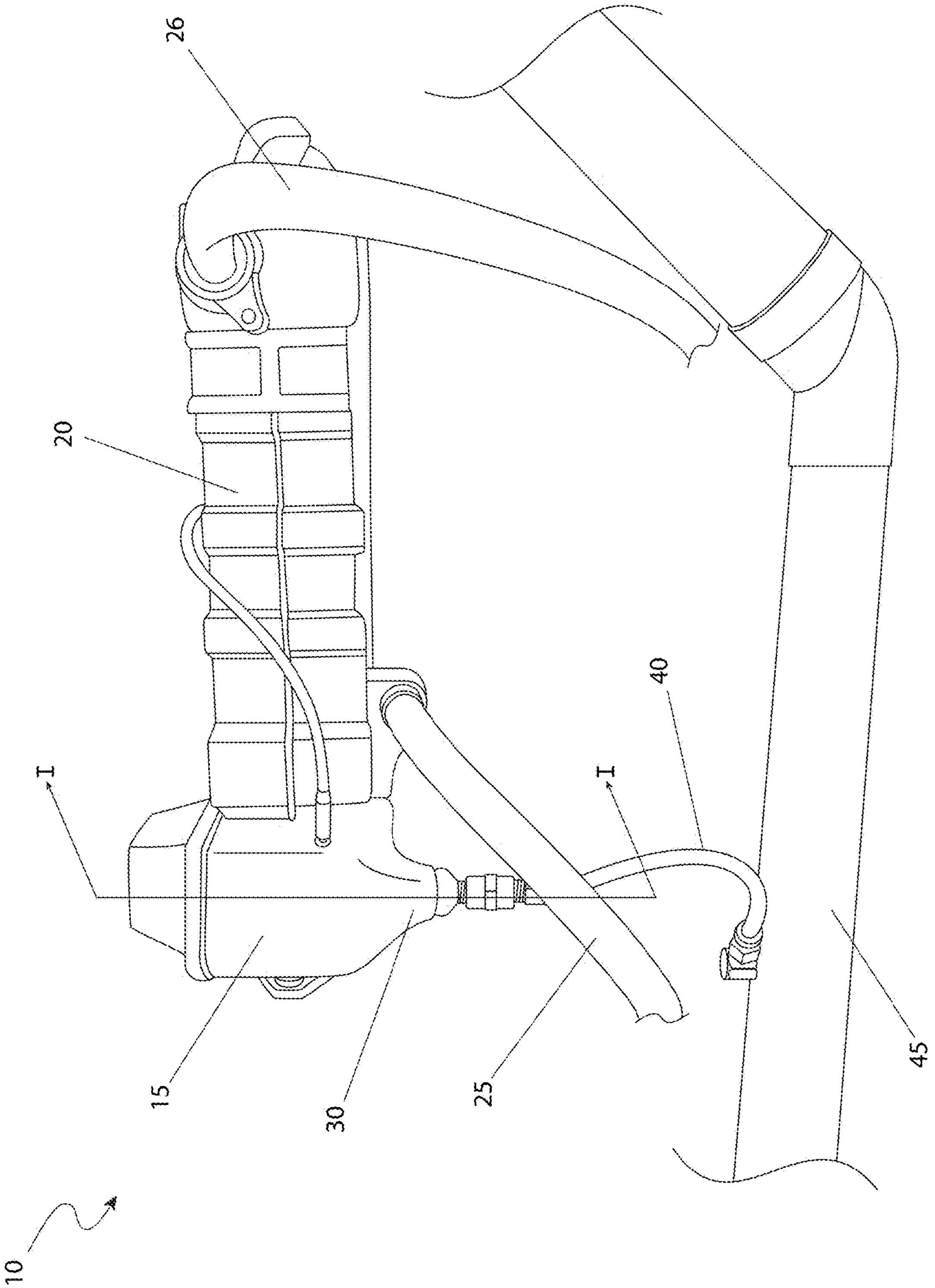
FIG. 1 is an environmental view of a soot-less exhaust gas recirculation (EGR) system 10 capable of producing processed air 80 for use in a diesel engine 56, and configured to be in fluid and environmental communication therewith, according to the preferred embodiment of the present invention.
Figure 2:
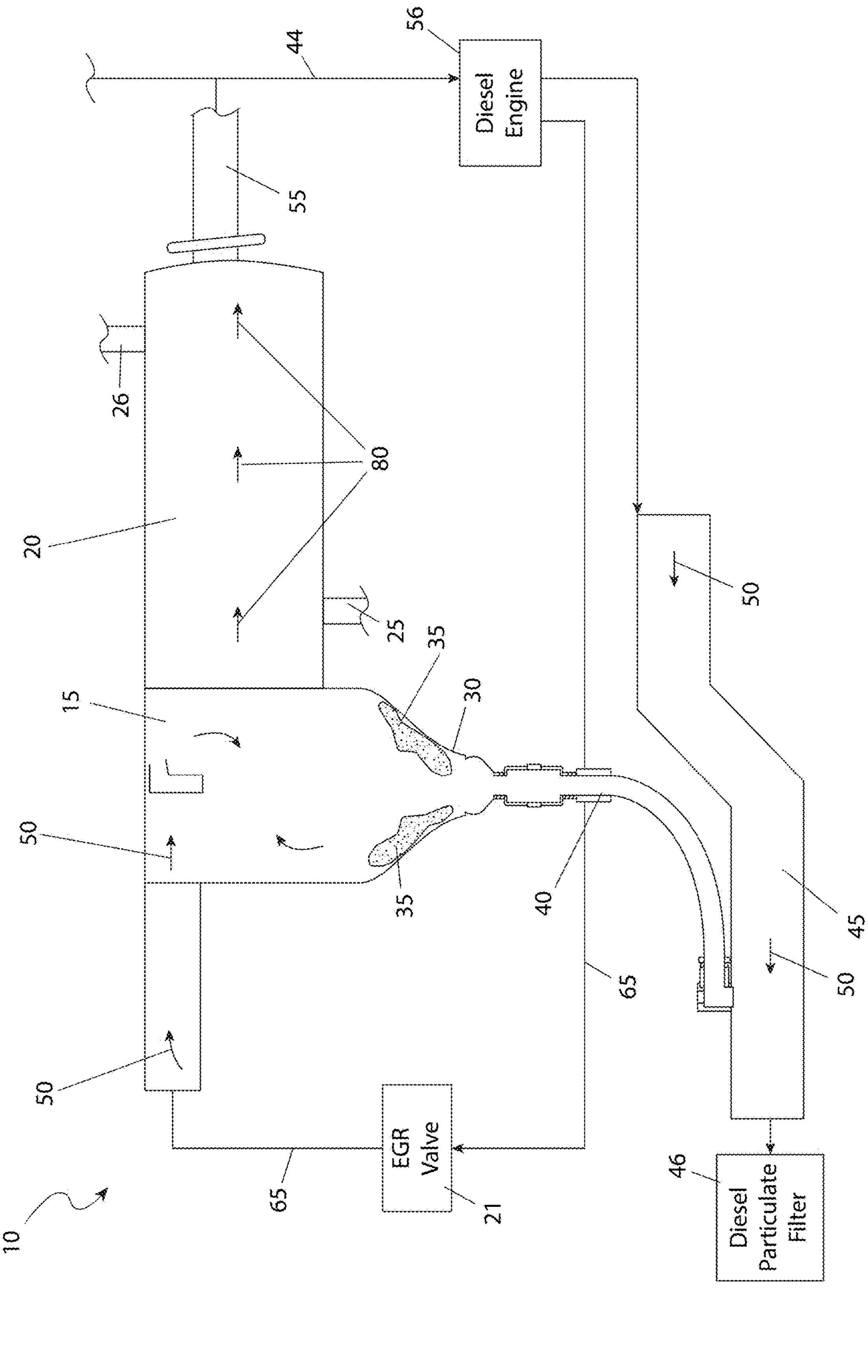
FIG. 2 is a process flow diagram of the soot-less exhaust gas recirculation (EGR) system 10, according to the preferred embodiment of the present invention; and, FIG. 3 is a sectional view of the soot-less exhaust gas recirculation (EGR) system 10, as seen along a line I-I, as shown in FIG. 1, according to the preferred embodiment of the present invention.
Figure 3:
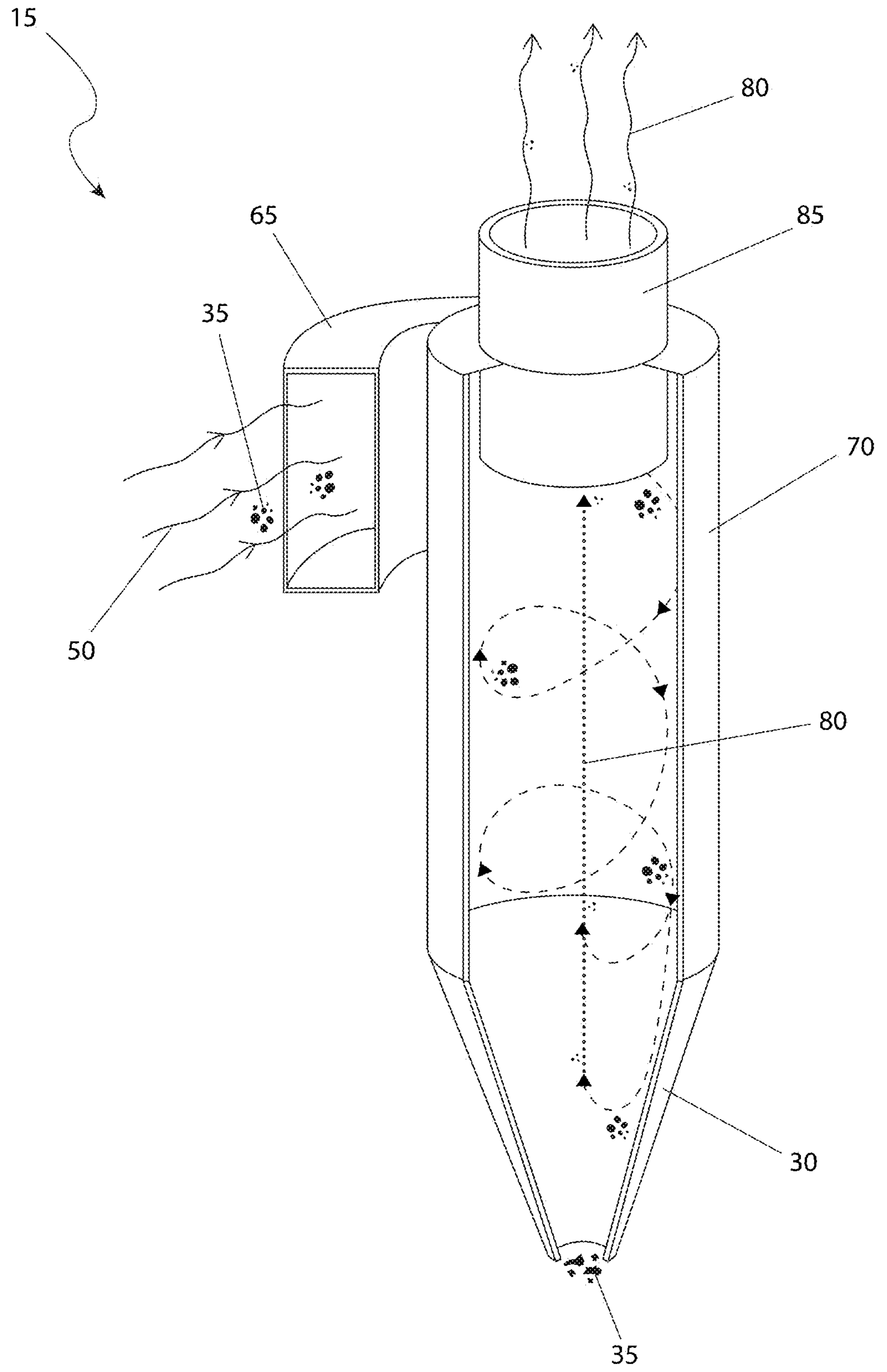

The best mode for carrying out the invention is presented in terms of its preferred embodiment, herein depicted within FIGS. 1 through 3. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms “a” and “an” herein do not denote a limitation of quantity, but rather denote the presence of at least one (1) of the referenced items.

3. Detailed Description of the Figures

Referring now to FIG. 1, an environmental view of the soot-less exhaust gas recirculation (EGR) system 10, provides a method to address and mitigate the prevalent issues of carbon buildup that creates clogging issues and the resultant high repair costs commonly associated with conventional exhaust gas recirculation (EGR) systems 10 in diesel engines 56. The soot-less exhaust gas recirculation (EGR) system (herein described as the "system") 10 can be adapted for a wide range of transportation or construction equipment with a diesel engine 56 equipped with an exhaust gas recirculation (EGR) cooler 20, including, but not limited to those used in: automotive applications, heavy-duty trucks, commercial vehicles, agricultural machinery, construction equipment, marine engines, and generators. The versatility of the system 10 ensures that various types of transportation or construction equipment with a diesel engine 56 can benefit from the efficiency and reliability improvements provided thereby. An exemplary diesel engine 56 is in fluid communication between an intake manifold 44 and an exhaust manifold 45 and produces exhaust gas 50 as a by-product of the combustion process. Notably, the scope of any diesel engine 56 can be considered capable of leveraging the advantages of this system 10 and is not intended to delimit the potential applications thereof.

The system 10 provides for a cyclone separator 15 that is positioned next to an EGR cooler 20. The cyclone separator 15 may be a wholly separate body from the EGR cooler 20 or may be located in a housing coextensive with the EGR cooler 20. It is envisioned that the cyclone separator 15 would be made of stainless steel for extended life under extreme environmental conditions. An inlet 65 of the cyclone separator 15 is in fluid communication directly with the diesel engine 56 (or alternately directly from the exhaust manifold 45) to convey exhaust gas 50 produced by the diesel engine 56 therein. The cyclone separator 15 produces processed air 80 from the exhaust gas 50. The cyclone separator 15 is also provided with a discharge cone 30 at its lower portion which empties soot 35 into a siphon tube 40. The cyclone separator 15 separates and collects the soot 35 during processing of the exhaust gas 50 to processed air 80. The siphon tube 40 is in fluid communication with the exhaust manifold 45, which then delivers the soot 35 entrained in the exhaust gas 50 to the diesel particulate filter 46 for subsequent processing before release to the environment. Examples of further processing, such as burning off the soot 35 in a regeneration cycle or collected within the diesel particulate filter 46, which is consumable and replaceable, may be performed.

An intake of the EGR cooler 20 is in fluid communication with an outlet 85 of the cyclone separator 15. An outlet of the EGR cooler 20 is in fluid communication with the intake manifold 44 of the diesel engine 56 via a crossover line 55. The EGR cooler 20 has a recirculating cooling means in fluid communication with a standard inlet cooling line 25 and a standard outlet cooling line 26. The recirculating cooling means provides thermal transfer with the processed air 80 during travel from the cyclone separator 15, through the EGR cooler 20, and through the crossover line 55 for subsequent delivery to the intake manifold 44.

The system 10 enacts a process to prevent or reduce exhaust gas 50 with harmful emissions from being released into the atmosphere. This process also keeps the EGR cooler 20, an EGR valve 21, the cylinder head valves of the diesel engine 56 and the piston rings of the diesel engine 56 from becoming clogged with soot 35 and is intended to provide significant savings in repair costs each year. The system 10 also is intended to allow a modern diesel engine 56 to meet higher emission standards due to cleaner burning of fuel and not any carbon by-products such as soot 35 produced during combustion within the diesel engine 56.

Referring next to FIG. 2, a process flow diagram of the system 10, according to the preferred embodiment of the present invention is depicted. The cyclone separator 15 is closely coupled to the EGR cooler 20 to allow for direct and immediate cooling of the processed air 80. Exhaust gas 50 is delivered to the cyclone separator 15 directly from the diesel engine 56 (or alternately directly from the exhaust manifold 45). Intake of exhaust gas 50 to the cyclone separator 15 is metered, manually or electronically, by the EGR valve 21. The cyclone separator 15 processes the exhaust gas 50 to processed air 80. The processed air 80 then proceeds through the EGR cooler 20 and into a crossover line 55, whereupon the processed air 80 is delivered to the intake manifold 44 of the diesel engine 56. The exhaust gas 50 rotates in a circular manner in the cyclone separator 15 as shown. In doing so, soot 35 is directed towards the discharge cone 30 of the cyclone separator 15 as shown. Further detail on the operation of the cyclone separator 15 will be provided herein below. As aforementioned described, the soot 35 then is routed into the siphon tube 40 and to the exhaust manifold 45.

Referring to FIG. 3, a sectional view of the system 10, as seen along a line I-I, as shown in FIG. 1, according to the preferred embodiment of the present invention, is shown. Operation of the cyclone separator 15 is generic in nature, with the process principles being non-specific to the operation of the system 10. A cyclone separator 15 may minimally be defined as having a body 70 and the discharge cone 30. The cyclone separator 15 may be a unitary construction or integrated with a shared housing with the EGR cooler 20. Exhaust gas 50 containing soot 35 enters the inlet 65 as provided at the upper portion of the body 70. The exhaust gas 50 then rotates around an inner surface of the body 70 and is directed downward in a generally spiral or helical airflow. As the exhaust gas 50 enters the top of the discharge cone 30 and travels downward, it transforms to processed air 80 which is directed into the center axis of the cyclone separator 15 and travels upward and out of the body 70 through an outlet 85. The outlet 85 delivers the processed air 80 to the EGR cooler 20 (as shown in FIGS. 1 and 2) and, after cooling, is subsequently delivered to the crossover line 55 (as shown in FIG. 2). The soot 35, now separated from the exhaust gas 50, falls out of the discharge cone 30 and into the siphon tube 40 (as shown in FIGS. 1 and 2) for subsequent disposition via the exhaust manifold 45 (as shown in FIGS. 1 and 2).

An embodiment of the soot-less exhaust gas recirculation (EGR) system 10 consists of a cyclone separator 15, an exhaust gas recirculation (EGR) cooler 20, an EGR valve 21, an inlet cooling line 25, an outlet cooling line 26, a discharge cone 30, soot 35, a siphon tube 40, an intake manifold 44, an exhaust manifold 45, a diesel particulate filter 46, exhaust gas 50, a crossover line 55, a diesel engine 56, an inlet 65, a cyclone body 70, processed air 80, and an outlet 85. The cyclone separator 15 has an inlet 65 directly in fluid communication with the diesel engine 56 or alternately with the exhaust manifold 45 to receive exhaust gas 50 containing soot 35. The cyclone body 70 directs the exhaust gas 50 in a spiral flow, separating soot 35 downward into the discharge cone 30, then into the siphon tube 40, which communicates with the exhaust manifold 45 for soot 35 disposal via the diesel particulate filter 46. Processed air 80 exits upward through the cyclone separator outlet 85 into the EGR cooler 20, which provides thermal transfer via the inlet cooling line 25 and outlet cooling line 26. Finally, the cooled processed air 80 travels through the crossover line 55 into the intake manifold 44, completing the recirculation process.

4. Operation of the Preferred Embodiment

The preferred embodiment of the present invention can be utilized by the common user in a simple and effortless manner with little or no training. It is envisioned that the system 10 would be constructed in general accordance with FIG. 1 through FIG. 3. It is envisioned that the system 10 would be made available as standard or optional equipment on a new diesel engine 56 and/or transportation and construction equipment. The system 10 may also be made available as an add-on aftermarket equipment as a kit that may be added to an existing diesel engine 56. The kit version may be purchased from specialty supply shops, motor vehicle parts stores, mechanical supply houses, mail order and internet supply houses and the like.

After procurement and prior to utilization, the system 10 would be installed as part of a new diesel engine 56 installation, or as an add-on kit, as described above. Various connections to the inlet cooling line 25, outlet cooling line 26, the siphon tube 40, the EGR valve 21, the diesel engine 56 (or alternately the exhaust manifold 45), the crossover line 55, and the intake manifold 44, would be provided as aforementioned described. At this point in time, the system 10 is ready for use.

During operation, the exhaust gas 50 containing soot 35 enters the inlet 65 at the upper portion of the body 70 of the cyclone separator 15. This may be metered in via the EGR valve 21. The exhaust gas 50 then rotates around the inward surface of the body 70 and is directed downward. As the exhaust gas 50 contacts the top of the discharge cone 30, the processed air 80 is shed of the majority of the soot 35 and is directed into the center axis of the cyclone separator 15 where it travels upward and out of the body 70 through the outlet 85 for delivery into the EGR cooler 20. The recirculated cooling means cools the processed air 80 as it travels through the EGR cooler 20, through the crossover line 55, and into the intake manifold 44 for further use by the diesel engine 56. The soot 35, now separated from the exhaust gas 50, falls out of the bottom of the discharge cone 30 and into the siphon tube 40. The siphon tube 40 empties the soot 35 into the exhaust manifold 45 and ultimately to the diesel particulate filter 46. Subsequent processing where the soot 35 is burned off during a regeneration cycle to prevent harmful emissions from being released into the atmosphere.

Utilization of the system 10 aims to keep the EGR cooler 20, the EGR valve 21, the cylinder head valves of the diesel engine 56 and the piston rings of the diesel engine 56, free of soot 35, thereby reducing maintenance costs. Additionally, operation of the system 10 allows the diesel engine 56 to meet higher emission standards.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A soot-less exhaust gas recirculation (EGR) system configured for use with a diesel engine, the system comprising:

a cyclone separator comprising a cyclone body having an inlet configured to receive exhaust gas containing soot from a diesel engine or an exhaust manifold of the diesel engine, and an outlet configured to discharge processed air, wherein the cyclone body is configured to direct the exhaust gas in a spiral flow such that soot is separated downward by centrifugal force and the processed air is directed upward along a central axis of the cyclone body through the outlet;

a discharge cone disposed at a lower portion of the cyclone separator and configured to receive soot separated from the exhaust gas by the spiral flow;

a siphon tube in fluid communication with the discharge cone and configured to return the separated soot to the exhaust manifold upstream of a diesel particulate filter; the diesel particulate filter being in fluid communication with the exhaust manifold and configured to receive and process the soot returned from the siphon tube;

an exhaust gas recirculation (EGR) valve disposed upstream of the cyclone separator inlet and configured to meter exhaust gas flowing from the diesel engine or exhaust manifold into the cyclone separator inlet;

an exhaust gas recirculation (EGR) cooler having an intake in direct fluid communication with the cyclone separator outlet and an outlet configured to discharge cooled processed air, wherein the EGR cooler is closely coupled to the cyclone separator outlet to provide immediate cooling of the processed air exiting the cyclone separator;

an inlet cooling line and an outlet cooling line each in fluid communication with the EGR cooler and configured to circulate coolant through the EGR cooler to provide thermal transfer for cooling the processed air passing therethrough; and, a crossover line configured to deliver the cooled processed air from the EGR cooler outlet to an intake manifold of the diesel engine; and, wherein the cyclone separator, the EGR valve, the EGR cooler, the siphon tube, the diesel particulate filter, and the crossover line cooperate to define a closed-loop soot remediation and recirculation pathway in which: exhaust gas is metered by the EGR valve upstream of and into the cyclone separator; soot is centrifugally separated within the cyclone separator and returned via the siphon tube to the exhaust manifold for disposal through the diesel particulate filter; and soot-reduced processed air exits upward through the cyclone separator outlet for immediate cooling in the EGR cooler before delivery to the intake manifold, thereby substantially preventing soot from entering the EGR cooler, the intake manifold, cylinder head valves, and piston rings of the diesel engine.

2. The soot-less exhaust gas recirculation (EGR) system of claim 1, wherein the cyclone separator and the EGR cooler are housed within a common enclosure forming a unitary assembly, and wherein the cyclone separator is constructed of stainless steel.

* * * * *